United States Patent
Marien et al.

(10) Patent No.: US 12,480,978 B2
(45) Date of Patent: Nov. 25, 2025

(54) CURRENT MEASURING APPARATUS WITH REDUNDANT CURRENT MEASUREMENT

(71) Applicant: Isabellenhütte Heusler GmbH & Co. KG, Dillenburg (DE)

(72) Inventors: Jan Marien, Herborn (DE); Benedikt Kramm, Wettenberg (DE)

(73) Assignee: ISABELLENHÜTTE HEUSLER GMBH & CO. KG., Dillenburg (DE)

( * ) Notice: Subject to any disclaimer, the term of this patent is extended or adjusted under 35 U.S.C. 154(b) by 177 days.

(21) Appl. No.: 18/005,345

(22) PCT Filed: Apr. 20, 2021

(86) PCT No.: PCT/EP2021/060245
§ 371 (c)(1),
(2) Date: Jan. 12, 2023

(87) PCT Pub. No.: WO2022/012791
PCT Pub. Date: Jan. 20, 2022

(65) Prior Publication Data
US 2023/0266368 A1    Aug. 24, 2023

(30) Foreign Application Priority Data

Jul. 15, 2020 (DE) .................. 10 2020 118 637.1

(51) Int. Cl.
*G01R 15/20* (2006.01)
*G01R 1/20* (2006.01)

(52) U.S. Cl.
CPC .......... *G01R 15/207* (2013.01); *G01R 1/203* (2013.01)

(58) Field of Classification Search
CPC ............................. G01R 15/207; G01R 1/203
(Continued)

(56) References Cited

U.S. PATENT DOCUMENTS 4,492,919 A * 1/1985 Milkovic ............. G01R 15/146
323/357
5,841,272 A 11/1998 Smith et al.
(Continued)

FOREIGN PATENT DOCUMENTS

DE          10060490 A1    6/2002
DE       102012212367 A1    1/2013
(Continued)

OTHER PUBLICATIONS

Translation of DE 102012212367A1 (Year: 2013).*
(Continued)

*Primary Examiner* — Paresh Patel
(74) *Attorney, Agent, or Firm* — Klintworth & Rozenblat LLP (57) ABSTRACT

The invention relates to a current measuring apparatus for redundant measurement of an electric current (I) with a low-resistance current measuring resistor (1) for current measurement according to the four-lead technique and with a magnetic field sensor (14). The invention provides that the electric current (I) to be measured in the current measuring apparatus is divided into a main current path with a main current (I1) and a secondary current path with a secondary current (I2), the main current path and the secondary current path together forming a parallel circuit. The low-resistance current measuring resistor (1) is arranged in the main current path and has the main current (I1) flowing through it, while the magnetic field sensor (14) is arranged in the secondary current path and measures the secondary current (I2).

21 Claims, 4 Drawing Sheets

(58) Field of Classification Search
USPC .......................................................... 324/126
See application file for complete search history.

(56) References Cited

U.S. PATENT DOCUMENTS

| | | | |
|---|---|---|---|
| 2011/0221429 | A1 | 9/2011 | Tamura |
| 2013/0181807 | A1 | 7/2013 | Hetzler |
| 2014/0347024 | A1 | 11/2014 | Rozman et al. |
| 2015/0088438 | A1 | 3/2015 | Kinsella |
| 2015/0309080 | A1 | 10/2015 | Chae et al. |
| 2020/0182909 | A1 | 6/2020 | Hetzler |
| 2020/0200799 | A1 | 6/2020 | Hung et al. |
| 2020/0300917 | A1 | 9/2020 | Dan et al. |
| 2021/0302474 | A1 | 9/2021 | Elian et al. |

FOREIGN PATENT DOCUMENTS

| | | | | | |
|---|---|---|---|---|---|
| DE | 102011088893 | A1 | | 6/2013 | |
| DE | 102016014130 | B3 | | 11/2017 | |
| DE | 102020111634 | B3 | | 4/2021 | |
| EP | 0605800 | A1 | | 7/1994 | |
| EP | 2511714 | A2 | | 10/2012 | |
| FR | 3006056 | A1 | * | 11/2014 | ........... G01R 15/207 |
| JP | H-06224014 | A | | 8/1994 | |
| JP | 2002257866 | A | | 9/2002 | |
| JP | 2002289412 | A | | 10/2002 | |
| JP | 2004294306 | A | | 10/2004 | |
| JP | 2009281773 | A | | 12/2009 | |
| JP | 2010101635 | A | | 5/2010 | |
| JP | 2010112767 | A | | 5/2010 | |
| JP | 2013510556 | A | | 3/2013 | |
| JP | 2013536424 | A | | 9/2013 | |
| JP | 2014522980 | A | | 9/2014 | |
| JP | 2015505040 | A | | 2/2015 | |
| JP | 2015210272 | A | | 11/2015 | |
| JP | 2016135039 | A | | 7/2016 | |
| JP | 2018170846 | A | | 11/2018 | |
| JP | 2019531469 | A | | 10/2019 | |
| JP | 2020038219 | A | | 3/2020 | |
| JP | 2020102626 | A | | 7/2020 | |
| WO | WO2014161624 | A1 | | 10/2014 | |
| WO | WO2015115472 | A1 | | 8/2015 | |

OTHER PUBLICATIONS

Translation of FR-3006056-A1 (Year: 2014).*
Office Action for DE102020118637.1 dated Mar. 23, 2021, 12 pages.
Japanese Office Action cited in connection with JP application No. 2023-502956 and machine translation thereof, dated Feb. 4, 2025, 22 pages.
Japanese Search Report cited in connection with JP application No. 2023-502956 and machine translation thereof, dated Jan. 27, 2025, 62 pages.
Dickinson, Richard; Friedrich, Andreas "Using Allegro Current Sens or ICs in Current Divider Configurations for Extended Measurement Range", Allegro MicroSystems, Inc., Oct. 24, 2013, [retrieve date; Jan. 27, 2025], the Internet <URL: https://web.archive.org/web/20131023234717/www.allegromicro.com/~/media/Files/Technical-Documents/AN295036-Current-Sensor-ICs-In-Current-Divider-Configurations.ashx>.
Japanese Office Action cited in connection with JP application No. 2023-502956 and machine translation thereof, dated Aug. 5, 2025, 20 pages.

* cited by examiner

CURRENT MEASURING APPARATUS WITH REDUNDANT CURRENT MEASUREMENT

(b) CROSS-REFERENCE TO RELATED APPLICATIONS

This application is a national phase entry of International Application PCT/EP2021/60245 filed dated Apr. 20, 2021 which claims priority from DE202010118637 filed dated Jul. 15, 2020.

(g) BACKGROUND OF THE INVENTION

The invention relates to a current measuring apparatus for redundant measurement of an electric current.

From EP 0 605 800 A1 a current measuring apparatus is known, which has a low-resistance current measuring resistor ("shunt"), whereby the electric current to be measured is measured according to the four-wire technique. Here, the electric current to be measured is passed through the low-resistance current measuring resistor, whereby the voltage drop across the low-resistance current measuring resistor is measured. According to Ohm's law, the voltage drop across the low-resistance current measuring resistor is a measure of the electric current to be measured.

Furthermore, it is known from the prior art to use Hall sensors for current measurement, which detect the magnetic field generated by the electric current to be measured.

In addition, a current measuring apparatus is known from EP 2 511 714 A2, which combines both measuring principles and has both a low-resistance current measuring resistor ("shunt") and a Hall sensor, which enables redundant current measurement. In this known current measuring apparatus, the electric current to be measured is passed through the low-resistance current measuring resistor, while the Hall sensor is arranged above the low-resistance current measuring resistor and measures the same current. These known current measuring apparatuses can measure currents up to 1000 A, with a resolution of 1 to 5 A and a tolerance of ±10%.

Furthermore, Hall sensors with an integrated conductor are known, whereby the current to be measured flows through the integrated conductor. Such Hall sensors have a resolution of about 0.5 to 1 A with a tolerance of ±1%.

However, the disadvantage of these known current measuring apparatuses is the fact that the measuring range of the entire current measuring apparatus is limited to 1000 A and has a low resolution and high tolerance. The chip sensors have a much lower measuring range, but a better resolution and smaller tolerance.

Finally, current measuring apparatuses according to the preamble of claim 1 are known from DE 10 2011 088 893 A1 and US 2020/0300917 A1. However, these known current measuring apparatuses are not yet optimal.

(1) FIELD OF THE INVENTION

The invention is therefore based on the task of creating a correspondingly improved current measuring apparatus.

(2) DESCRIPTION OF RELATED ART

This task is solved by a current measuring apparatus according to the main claim.

First of all, the current measuring apparatus according to the invention has, in accordance with the state of the art, a low-resistance current measuring resistor in order to enable current measurement according to the four-wire technique, as is known, for example, from EP 0 605 800 A1. In this case, the electric current is passed through the low-resistance current measuring resistor, and the voltage drop across the low-resistance current measuring resistor is measured. The voltage measurement value then forms a measure of the electric current in accordance with Ohm's law.

Furthermore, in accordance with the prior art according to EP 2 511 714 A2, the current measuring apparatus according to the invention also comprises a magnetic field sensor for redundant current measurement, i.e. the magnetic field sensor measures the electric current according to a measuring principle other than the four-wire technique. For example, the magnetic field sensor may be a Hall sensor, as is known per se. However, it is alternatively also possible that the magnetic field sensor is a magnetoresistive magnetic field sensor, such as a so-called GMR sensor (GMR: Giant magnetoresistance), as is also known per se from the prior art. Thus, the invention is not limited to a particular type of magnetic field sensor.

The current measuring apparatus according to the invention is now distinguished from the prior art in that the electric current to be measured in the measuring apparatus is divided into a main current path with a main current and a secondary current path with a secondary current, the main current path and the secondary current path together forming a parallel circuit.

The low-resistance current measuring resistor is arranged in the main current path and the main current flows through it, so that the main current can be measured according to the four-wire technique.

The magnetic field sensor, on the other hand, is arranged in the secondary current path and measures the secondary current according to a different measuring principle, which again enables redundant current measurement.

In contrast to the known current measuring apparatus according to EP 2 511 714 A2, the low-resistance current measuring resistor on the one hand and the magnetic field sensor on the other hand do not measure the same current, but different currents, namely the main current on the one hand and the secondary current on the other hand. This has the advantage that the measuring range of the entire current measuring apparatus is not restricted by the limited measuring range of the magnetic field sensor, since the magnetic field sensor measures a different current than the low-resistance current measuring resistor.

In a preferred embodiment of the invention, the parallel circuit comprising the main current path on the one hand and the secondary current path on the other hand is designed such that the main current through the main current path is substantially larger than the secondary current in the secondary current path. For example, the main current can be larger than the secondary current by a factor of at least 10, 100, 200, 500 or even 1000.

Therefore, the secondary current path preferably has an electrical resistance value that is significantly greater than the resistance value of the main current path. For example, the resistance value of the secondary current path may be greater than the resistance value of the main current path by a factor of 10, 100, 200, 500 or 1000.

In absolute terms, the resistance value of the main current path can be in the range of $1\mu\Omega$, $10\mu\Omega$, $20\mu\Omega$, $50\mu\Omega$, $100\mu\Omega$, $200\mu\Omega$, or $500\mu\Omega$, with deviations of no more than ±50%, ±20%, ±10%, ±5%, ±2%, or ±1% possible in this range definition.

The resistance value of the secondary current path, on the other hand, lies in absolute terms, for example, in the range of 1 mΩ, 2 mΩ, 5 mΩ, 10 mΩ, 20 mΩ, 50 mΩ or 100 mΩ, with deviations of a maximum of ±50%, ±20%, ±10%, ±5%, ±2% or ±1% being possible in this range definition.

The low-resistance current measuring resistor preferably has a larger current measuring range than the magnetic field sensor. The current measuring range of the magnetic field sensor is thus usually considerably smaller than the current measuring range of the low-resistance current measuring resistor. However, this is not troublesome in the current measuring apparatus according to the invention because the magnetic field sensor on the one hand and the low-resistance current measuring resistor on the other hand measure different currents, so that the smaller current measuring range of the magnetic field sensor does not restrict the overall current measuring range of the current measuring apparatus according to the invention.

Furthermore, a compensating resistor can additionally be arranged in the secondary current path with the magnetic field sensor in order to reduce the temperature dependence of the measurement. The idea of using a compensating resistor to reduce the temperature dependence of the measurement is known in principle from DE 10 2016 014 130 B3, so that a detailed description of how the compensating resistor works can be dispensed with. At this point, it should only be mentioned that the main current path and the secondary current path in the current measuring apparatus according to the invention each contain conductor material (e.g. copper) with a certain first temperature coefficient with respect to the resistance value and resistor material with a certain second temperature coefficient with respect to the resistance value, the first temperature coefficient of the conductor material being substantially larger than the second temperature coefficient of the resistor material. Thus, the resistance value of the conductor material is substantially more temperature dependent than the resistance value of the resistor material. For example, the two temperature coefficients of the conductor material on the one hand and the resistor material on the other hand may differ by a factor of at least 10, 20, 50, 100 or 200. The compensating resistor in the secondary current path, on the other hand, consists of a resistor material that has a significantly lower temperature coefficient than the conductor material. The compensating resistor is now dimensioned with regard to its resistance value in such a way that the temperature dependence of the resistance value of the conductor material is at least partially compensated.

Thus, the first temperature coefficient of the conductor material may be in the range of 1,000-10,000 ppm/K or 3,600-4,000 ppm/K, while the second temperature coefficient of the resistor material is in the range of 0 to ±100 ppm/K, 0 to ±50 ppm/K, 0 to ±20 ppm/K or 0 to ±10 ppm/K.

To compensate for the temperature dependencies, the main current path and the secondary current path preferably have the same resistance ratio between the resistance value of the lead term material and the resistance value of the resistance material of the low resistance current sense resistor or the compensating resistor. Preferably, the deviation of the resistance ratio between the main current path and the secondary current path is smaller than ±20%, ±10%, ±5% or ±2%.

In the current measuring apparatus according to the invention, the low-resistance current measuring resistor can be formed in a conventional manner. Preferably, the low-resistance current measuring resistor is plate-shaped with plate-shaped current connecting parts and a plate-shaped resistor element, the plate-shaped resistor element being arranged in the current flow direction between the two plate-shaped current connecting parts, as is already known per se from EP 0 605 800 A1.

Furthermore, it is possible within the scope of the invention that at least one of the two plate-shaped current connecting parts and/or the resistance element of the low-resistance current measuring resistor has an incision on one or both sides for trimming the resistance value. In addition, the plate-shaped connecting parts can also have a central incision for trimming the resistance value.

It has already been mentioned above that in current measurement according to the four-wire technique, the voltage drop across the low-resistance current measuring resistor is a measure of the electric current flowing through the low-resistance current measuring resistor according to Ohm's law. The current measuring apparatus according to the invention therefore has at least one pair of voltage measuring contacts which measure the voltage drop across the low-resistance current measuring resistor.

Preferably, even several pairs of voltage measuring contacts are provided, which are arranged distributed transversely to the current flow direction, in order to be able to compensate inhomogeneities of the current density in the current measuring resistor metrologically. The idea of measuring the voltage drop across the low-resistance current measuring resistor by means of several pairs of voltage measuring contacts is known per se from WO 2014/161624 A1 and therefore need not be described in detail.

Furthermore, within the scope of the invention, it is also possible for several pairs of voltage measuring contacts to be arranged in series on the low-resistance current measuring resistor in the direction of current flow, as described in DE 10 2020 111 634.9.

In addition, the current connecting parts of the low-resistance current measuring resistor can have central incisions, also referred to as current shadows, each surrounding one of the voltage measuring contacts in order to influence the current density in the current connecting parts. Such current shadows are already known from the prior art and are described, for example, in DE 10 2020 111 634.9.

In the preferred embodiment of the invention, a printed circuit board is arranged on the plate-shaped current measuring resistor, which also carries the magnetic field sensor (e.g. Hall sensor, GMR sensor). The magnetic field sensor on the one hand and the current measuring resistor on the other hand are preferably located on opposite sides of the printed circuit board.

The printed circuit board is preferably firmly connected to the low-resistance current measuring resistor and has vias in order to be able to contact the two current connecting parts of the low-resistance current measuring resistor. The vias preferably contact the current connecting parts downstream before the resistor element of the low-resistance current measuring resistor and downstream after the resistor element of the low-resistance current measuring resistor.

In this case, the secondary current path preferably runs on or in the printed circuit board, while the main current path runs through the low-resistance current measuring resistor.

The printed circuit board may also carry an evaluation circuit that measures the voltage drop across the resistor element of the low-resistance current measuring resistor, the output signal of the magnetic field sensor, and/or the voltage drop across the compensating resistor in the secondary current path.

Furthermore, the printed circuit board may have an interface to output the output signal of the magnetic field sensor and/or the voltage reading of the voltage across the resistor element of the low resistance current measuring resistor.

In the preferred embodiment of the invention, the printed circuit board has a plurality of parallel layers. In this case, the compensating resistor is preferably arranged on the uppermost layer of the printed circuit board. The secondary current path with the secondary current is preferably initially divided into several layers of the printed circuit board upstream of the compensating resistor and is only brought together shortly before the compensating resistor, so that the entire secondary current flows through the compensating resistor. Downstream of the compensating resistor, the secondary current path is then divided again between the various layers of the printed circuit board. This division of the secondary current path to several layers of the printed circuit board offers the advantage that the resistance value in the secondary current path is relatively small.

Furthermore, it should be mentioned that the current measuring apparatus usually has a high-voltage area and a low-voltage area. The low-resistance current measuring resistor is located entirely in the high-voltage area, while the magnetic field sensor separates the high-voltage area from the low-voltage area. Thus, the magnetic field sensor has a low-voltage side, which is used, for example, to output output signals and to supply a supply voltage. In addition, the magnetic field sensor has a high-voltage side that includes the secondary current path. The magnetic field sensor contains an island that separates the high-voltage area from the low-voltage area.

In general, it should be mentioned that the current measuring apparatus according to the invention can have a current measuring range that extends to at least 0.5 kA, 1 kA, 2 kA, 5 kA, 10 kA or 20 kA.

Furthermore, it should be mentioned that the current measuring apparatus according to the invention preferably has a high dielectric strength on the input side, which may, for example, extend up to an operating voltage of at least 100 V, 500 V or 1 kV.

The aforementioned conductor material of the current connecting parts is preferably copper or a copper alloy or aluminum or an aluminum alloy.

The resistance material of the resistance element of the low-resistance current measuring resistor may be, for example, a copper alloy, in particular a copper-manganese-nickel alloy. For example, it can be CuMn12Ni2, Cu84Ni4Mn12 or Cu65Mn25Ni10. Alternatively, it is possible that the resistor material is a copper-manganese-tin alloy, such as CuMn7Sn2.3. Furthermore, it is also possible that the resistor material is a copper-chromium alloy. Finally, the resistor material may also be a nickel alloy, such as NiCr or CuNi.

Furthermore, it should be mentioned that the conductor material of the current connecting parts of the low-resistance current measuring resistor preferably has a lower specific electrical resistance than the resistor material of the resistance element.

For example, the conductor material of the current connecting parts of the low-resistance current measuring resistor may have a specific electrical resistance of less than 20 μΩcm, 10 μΩcm, 5 μΩcm or 2 μΩcm.

In contrast, the resistive material of the resistor element of the low-resistance current measuring resistor preferably has a specific electrical resistance of less than 1000 μΩcm, 500 μΩcm, 250 μΩcm, 100 μΩcm or 50 μΩcm.

In general, it should still be mentioned that the low-resistance current measuring resistor preferably has a resistance value that is at most 500 mΩ, 200 mΩ, 100 mΩ, 50 mΩ, 20 mΩ, 10 mΩ, 5 mΩ, 2 mΩ or 1 mΩ.

Other advantageous further embodiments of the invention are indicated in the dependent claims or are explained in more detail below together with the description of the preferred embodiments of the invention with reference to the figures.

(2i) BRIEF DESCRIPTION OF THE SEVERAL VIEWS OF THE DRAWING(S)

(2j) DETAILED DESCRIPTION OF THE INVENTION

FIGS. 1-4 show different representations of a current measuring apparatus according to the invention for measuring an electric current I, whereby the current measurement is carried out redundantly, namely on the one hand according to the known four-wire technique and on the other hand by a magnetic field measurement.

Figure 1:
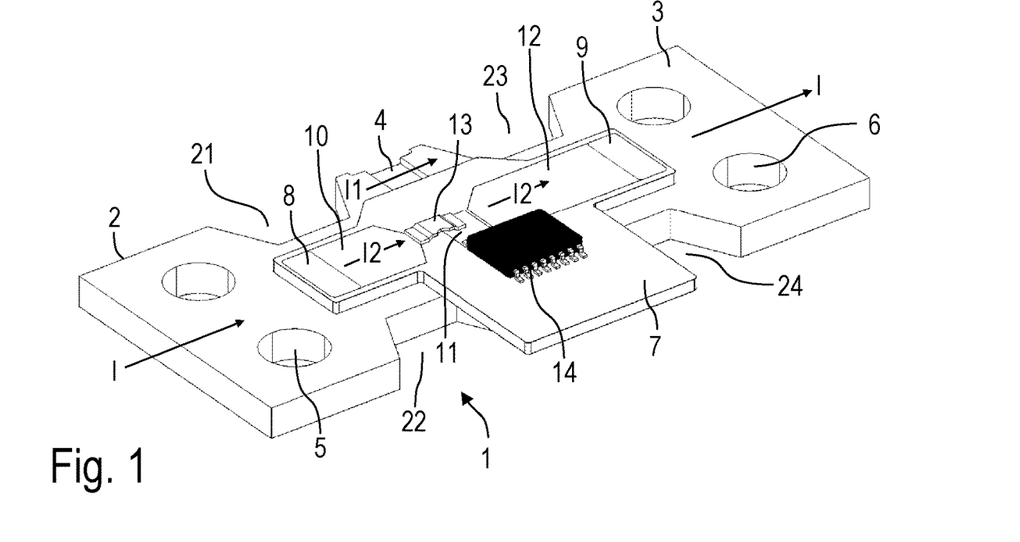
FIG. 1 shows a perspective view of a current measuring apparatus according to the invention with a low-resistance current measuring resistor and a Hall sensor.
Figure 2:
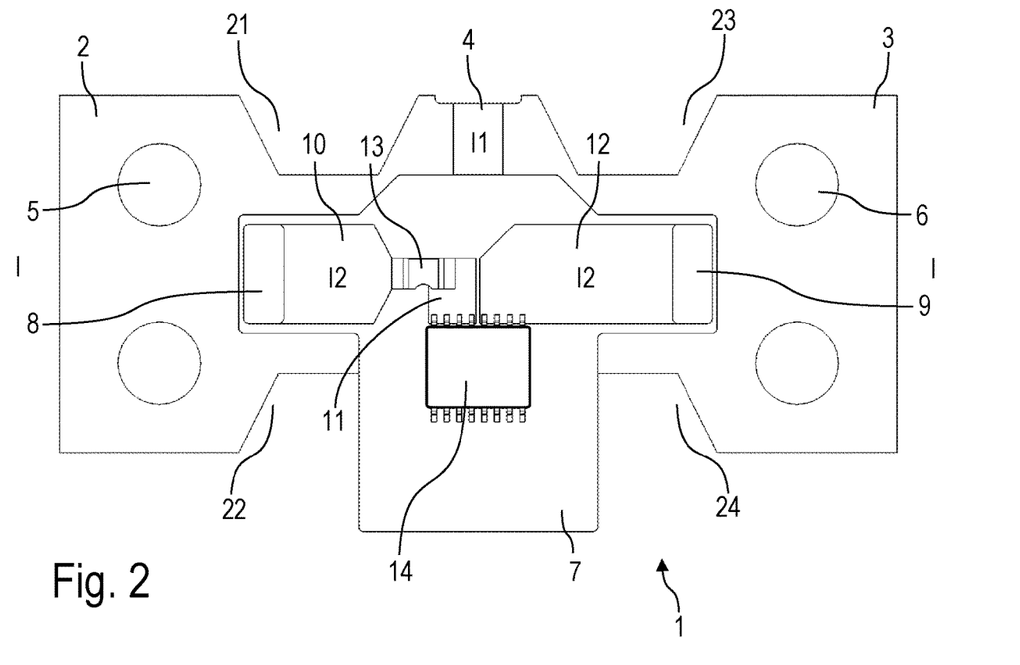
FIG. 2 shows a top view of the current measuring apparatus according to FIG. 1.
Figure 3:
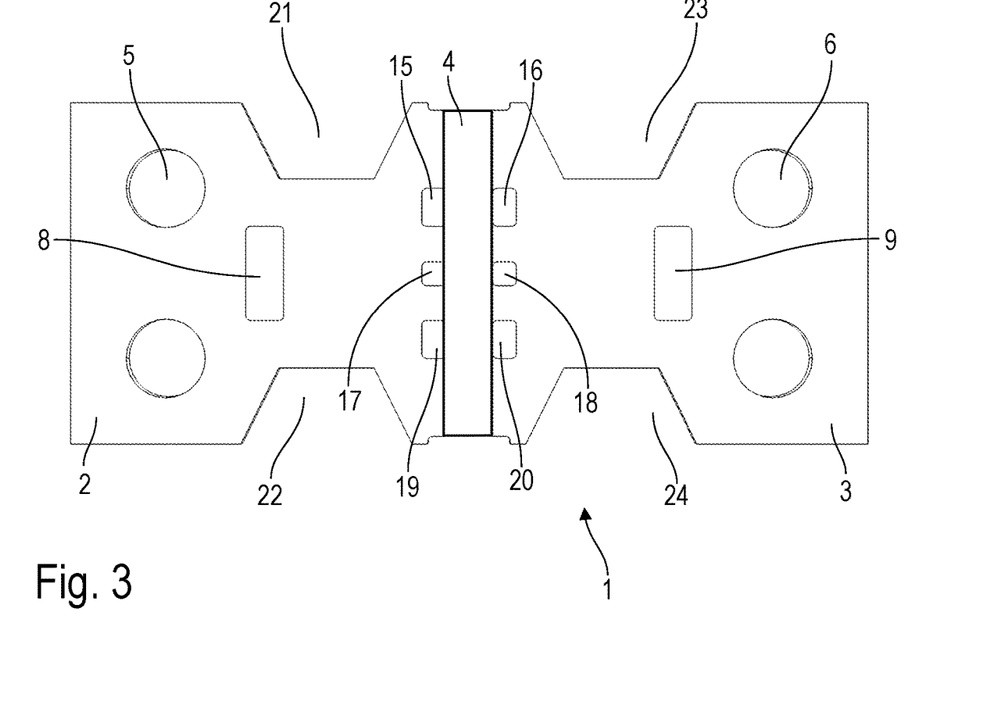
FIG. 3 shows a top view of the current measuring resistor according to FIGS. 1 and 2.

For current measurement according to the four-wire technique, the current measuring apparatus has a low-resistance current measuring resistor 1, which consists of two plate-shaped current connecting parts 2, 3 and a low-resistance resistor element 4, which is also plate-shaped and is located in the direction of current flow between the two current connecting parts 2, 3. The current connecting part 2 serves to introduce the electric current I to be measured into the current measuring resistor 1, while the current connecting part 3 serves to discharge the electric current I to be measured from the current measuring resistor 1, as is known from the prior art.

The two current connecting parts 2, 3 each have cylindrical bores 5, 6, which allow, for example, a mechanical connection of busbars.

On the upper side of the current measuring resistor 1 there is a multilayer printed circuit board 7 which is connected to the connecting parts 2 and 3 by means of two vias 8, 9. The via 8 contacts the current connecting part 2, while the via 9 contacts the other current connecting part 3.

On the upper side of the printed circuit board 7 there are conductor paths 10, 11, 12 and a compensating resistor 13.

In the current measuring apparatus according to the invention, the electric current I to be measured is divided into a main current I1 and a secondary current I2. The main current I1 flows in the current measuring resistor 1 from the current connecting part 2 through the resistor element 4 to the current connecting part 3. The secondary current I2, on the other hand, flows from the current connecting part 2 through the vias 8, through the conductor path 10, through the compensating resistor 13, through the conductor path 11, through a Hall sensor 14, through the conductor path 12, through the vias 9 and back into the current connecting part 3, where the secondary current I2 combines again with the main current I1 to form the current I.

For voltage measurement according to the four-wire technique, several pairs of voltage measuring contacts 15-20 are provided (cf. FIG. 3), each of the pairs of voltage measuring contacts 15, 16, 17, 18 or 19, 20 measuring the voltage at the current connecting part 2 on the one hand and at the current connecting part 3 on the other hand. The pairs of voltage measuring contacts 15-20 are here arranged distributed transversely to the current flow direction in order to be able to compensate inhomogeneities of the current density in the current measuring resistor 1 metrologically, as described in WO 2014/161624 A1.

The voltages at the voltage measuring contacts 15-20 can, for example, be measured by a measuring circuit which may be integrated in the Hall sensor 14. However, it is alternatively also possible that a separate measuring circuit is arranged on the printed circuit board 7, which measures the voltage drop across the resistance element 4 of the low-resistance current measuring resistor 1.

Furthermore, it should be mentioned that the current measuring resistor 1 has several incisions 21-24 laterally in the two current connecting parts 2, 3, which serve in combination with the compensating resistor for temperature compensation.

The purpose of the compensating resistor 13 in the secondary current path is to reduce the temperature dependence of the measurement, as is already known in itself from patent DE 10 2016 014 130 B3.

Furthermore, it should be mentioned that the Hall sensor 14 measures the secondary current I2 which flows through the Hall sensor 14 for this purpose. At its measuring side, the Hall sensor 14 is therefore exposed to the high voltage in the secondary current path. In addition, the Hall sensor 14 also has a low-voltage side, which is used to output a measurement signal and supply a supply voltage. The Hall sensor 14 thus separates the high-voltage side from the low-voltage side and has integrated insulation for this purpose.

The current measuring apparatus according to the invention enables redundant current measurement by means of different measuring principles, namely, on the one hand, by means of a four-wire measurement by means of the low-resistance current measuring resistor 1 and, on the other hand, by means of a magnetic field measurement by means of the Hall sensor 14.

It should be mentioned here that the secondary current I2 is considerably smaller than the main current I1 flowing through the low-resistance current measuring resistor 1. The Hall sensor 14 can therefore have a much smaller current measurement range, which is advantageous. For example, Hall sensors with an integrated conductor often have a small current measuring range of 5 A to 50 A.

Figure 4:
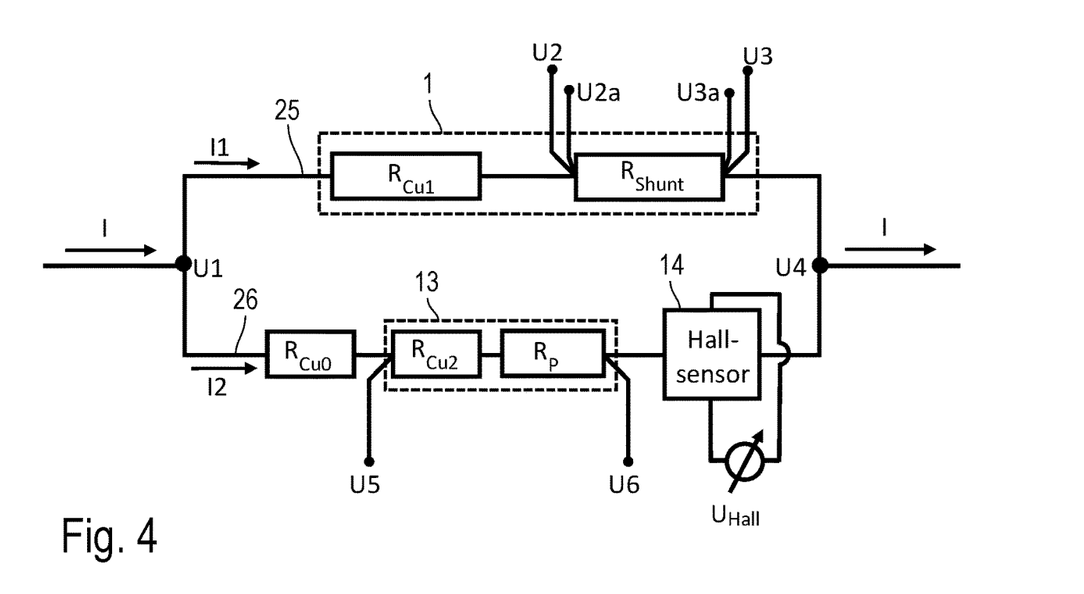
FIG. 4 shows an equivalent circuit of the current measuring apparatus according to FIGS. 1-3.

In the following, the equivalent circuit diagram according to FIG. 4 will now be described, which shows a main current path 25 and a secondary current path 26, whereby the main current path 25 and the secondary current path 26 form a parallel circuit.

In the main current path 25, essentially only the low-resistance current measuring resistor 1 is arranged, which is represented in the equivalent circuit diagram by a series connection of a ohmic resistor $R_{Shunt}$ and a ohmic resistor $R_{CU1}$. The resistor $R_{Shunt}$ represents the ohmic resistance of the low-resistance resistor element 4. The ohmic resistor $R_{CU1}$, on the other hand, represents the resistance of the two current connecting parts 2, 3.

The Hall sensor 14 is arranged in the secondary current path 26. Furthermore, the compensating resistor 13 is located in the secondary current path 26, which is represented by an ohmic resistor $R_P$ and an ohmic resistor $R_{CU2}$. The resistor $R_P$ corresponds to the resistor element of the compensating resistor 13, while the resistor $R_{CU2}$ corresponds to the two connecting parts of the compensating resistor 13. In addition, a resistor $R_{CU0}$ is shown in the secondary current path 16, which represents the resistance value of the vias 8, 9 and the conductor paths 10-12.

In operation, an evaluation circuit measures the voltage drop across the resistor element 4 of the low-resistance current measuring resistor 1. For this purpose, voltage measuring contacts U2/U3, U2A/U3A, which correspond to the voltage measuring contacts 15-20 in FIG. 3, are shown in the equivalent circuit diagram in FIG. 4.

Secondly, the evaluation circuit detects the output voltage $U_{HALL}$ measured by the Hall sensor 14.

Finally, the evaluation circuit also detects the voltage that drops across the equalizing resistor 13. For this purpose, the voltage measuring contacts U5/U6 are shown in the equivalent circuit diagram according to FIG. 4.

Figure 5:
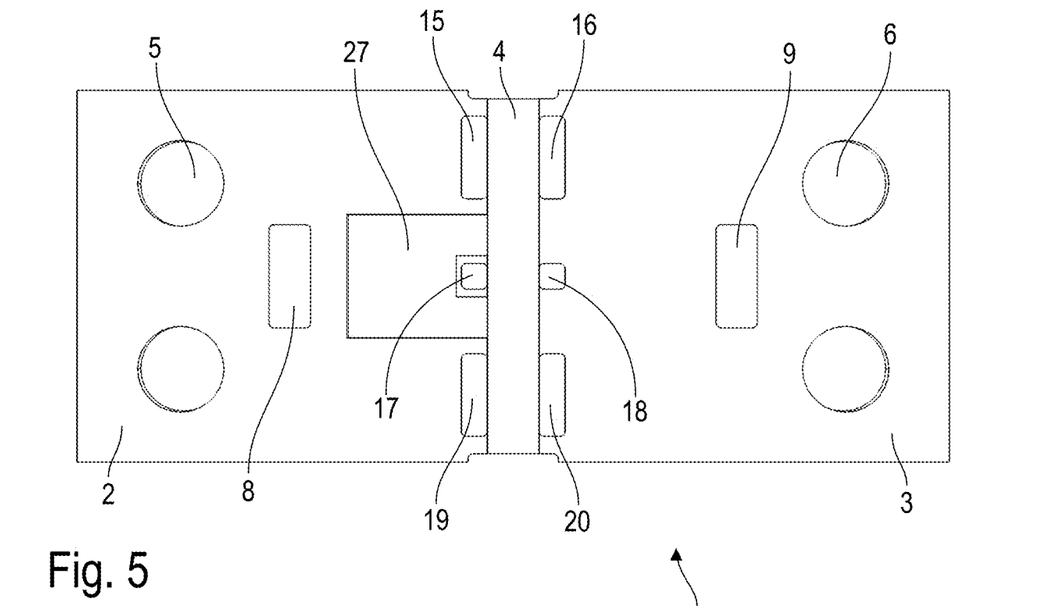
FIG. 5 shows a modification of FIG. 3.

FIG. 5 shows a modification of the current measuring resistor 1 according to FIG. 3. The modification according to FIG. 5 largely corresponds to the current measuring resistor 1 according to FIG. 3, so that to avoid repetition reference is made to the above description, whereby the same reference signs are used for corresponding details.

A special feature of this embodiment is that an incision 27, also referred to as a current shadow, is arranged in the current connecting part 2 and surrounds the voltage measuring contact 17. The technical background and operation of such a current shadow is described, for example, in WO 2014/161624 A1. Thus, the current shadow enables an improvement of the measuring accuracy.

Figure 6:
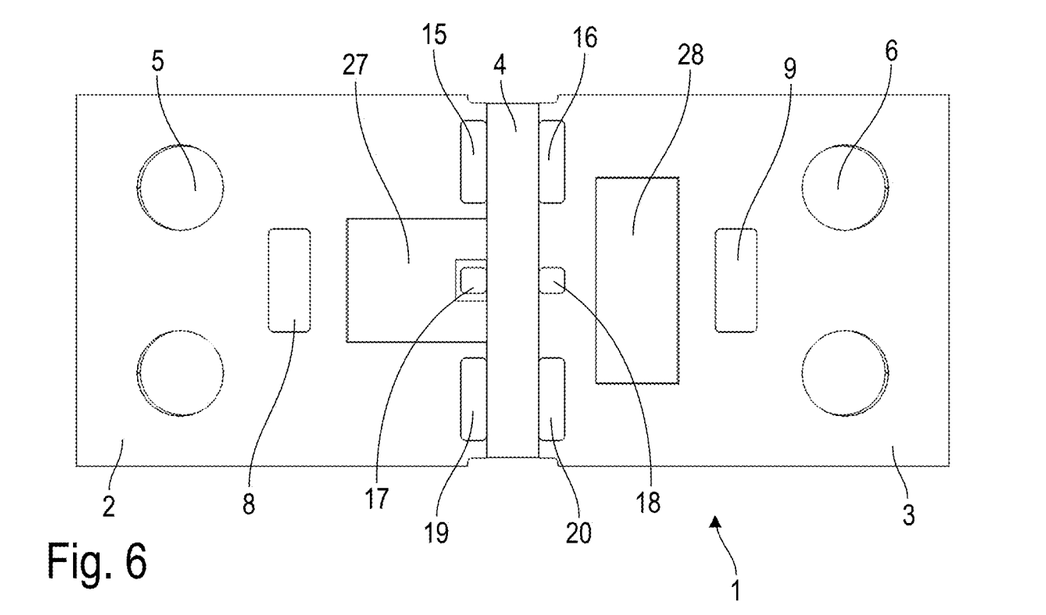
FIG. 6 shows a further modification of FIG. 3.

FIG. 6 shows a further modification of the current measuring resistor 1 according to FIG. 5, so that in order to avoid repetition, reference is again made to the above description, with the same reference signs being used for corresponding details.

A special feature of this embodiment is that an incision 28 is also arranged in the other current connecting part 3.

Figure 7:
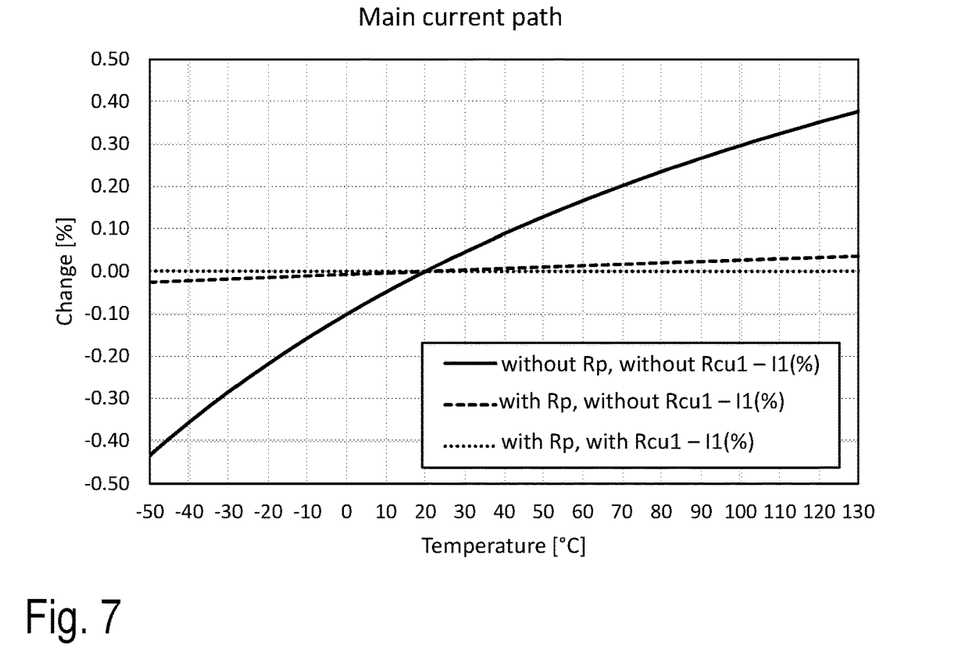
FIG. 7 shows the temperature dependence of the current measurement in the main current path with and without an equalizing resistor.

FIG. 7 shows the temperature dependence of the current measurement of the main current I1 in different variants. The solid line shows the course of the change without the compensating resistor $R_P$ or 13 and without taking into account the ohmic resistance $R_{CU1}$ of the current connecting parts 2, 3. The dashed line, on the other hand, shows the course taking into account the compensating resistor 13. Finally, the dotted line shows the course taking into account the compensating resistor $R_P$ and also taking into account the ohmic resistance $R_{CU1}$ of the current connecting parts 2, 3.

Figure 8:
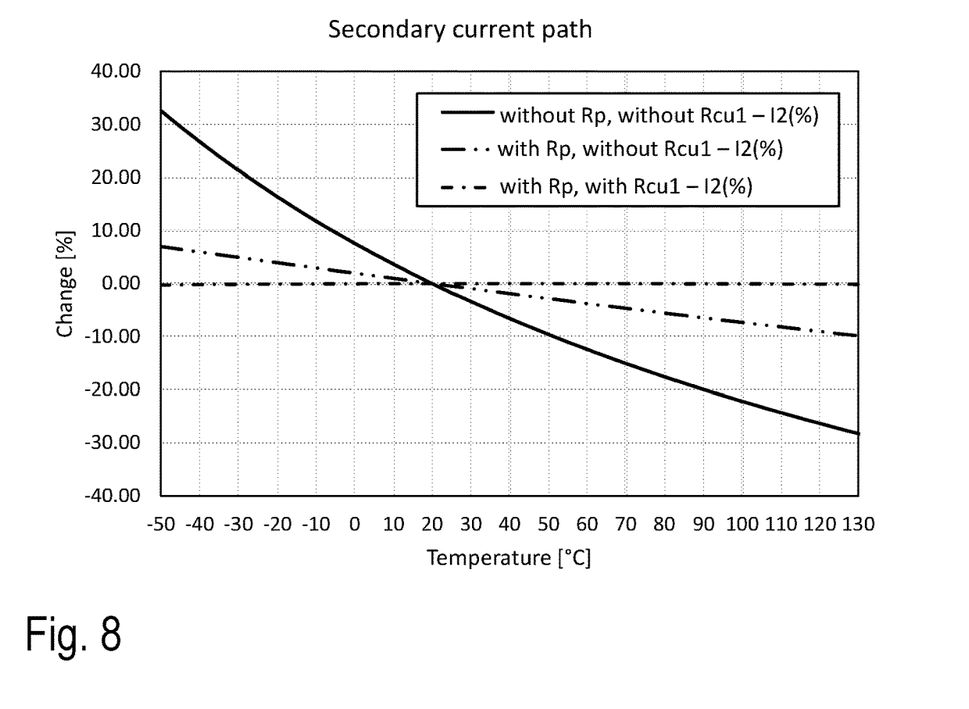
FIG. 8 shows the temperature dependence of the current measurement in the secondary current path with and without a compensating resistor.

FIG. 8 shows the temperature dependence of the current measurement of the secondary current I2 two in the secondary current path 26 for the same variants as in FIG. 7.

The invention is not limited to the preferred embodiments described above. Rather, a large number of variants and deviations are conceivable which also make use of the inventive idea and therefore fall within the scope of protection. In particular, the invention also claims protection for the subject-matter and the features of the dependent claims independently of the respective claims referred to and in particular also without the features of the main claim. The invention thus comprises various aspects of the invention which enjoy protection independently of one another.

LIST OF REFERENCE SIGNS

1 Low-resistance current measuring resistor
2 Current connecting part of the current measuring resistor for introducing the current to be measured
3 Current connecting part of the current measuring resistor for discharging the current to be measured
4 Resistor element of the current measuring resistor
5,6 Bores in the current measuring resistor for fixing current contacts
7 Printed circuit board
8 Via in the printed circuit board in front of the compensating resistor
9 Via in the printed circuit board behind the compensating resistor
10 Conductor path on the printed circuit board in front of the compensating resistor
11 Conductor path on the printed circuit board between the compensating resistor and the magnetic field sensor
12 Conductor path on the printed circuit board behind the magnetic field sensor
13 Compensating resistor
14 Hall sensor
15-20 Voltage measuring contacts for voltage measurement above the resistance element of the current measuring resistor
21-24 Incisions in the current connecting parts
25 Main current path
26 Secondary current path
27, 28 Incisions (current shadows)
I Current to be measured
I1 Main current
I2 Secondary current
$R_{Shunt}$ Resistance of the resistance element of the current measuring resistor
$R_{Cu1}$ Resistance of the current connection element of the current measuring resistor
$R_P$ Resistance of the resistance element of the compensating resistor
$R_{Cu2}$ Resistance of the current connecting parts of the compensating resistor
$R_{Cu0}$ Resistance of the secondary current paths before and after the compensating resistor
$U_{Hall}$ Hall voltage
U2/U3 Voltage measuring contacts for voltage measurement across the resistance element of the current measuring resistor
U2a/U3a Voltage measuring contacts for voltage measurement across the resistance element of the current measuring resistor
U5/U6 Voltage measuring contacts for voltage measurement across the resistor element of the equalizing resistor

The invention claimed is:

1. A current measuring apparatus for measuring an electric current, comprising:
a) a low-resistance current measuring resistor for current measurement according to the four-wire technique, and
b) a magnetic field sensor, in particular as a Hall sensor or as a magnetoresistive magnetic field sensor, for redundant current measurement,
c) wherein the electric current to be measured is divided in the current measuring apparatus into a main current path with a main current and a secondary current path with a secondary current, the main current path and the secondary current path together forming a parallel circuit,
d) wherein the low-resistance current measuring resistor is arranged in the main current path and has the main current flowing through it, and
e) wherein the magnetic field sensor is arranged in the secondary current path and measures the secondary current,
f) wherein the parallel circuit is designed such that the main current through the main current path with the low-resistance current measuring resistor is greater than the secondary current in the secondary current path with the magnetic field sensor, namely by a factor of at least 10,
g) wherein the low-resistance current measuring resistor is plate-shaped, with plate-shaped current connecting parts and a plate-shaped resistor element, the plate-shaped resistor element being arranged between the two plate-shaped current connecting parts in the direction of current flow,
h) wherein
  a) a printed circuit board is arranged on the plate-shaped current measuring resistor, and
  b) the printed circuit board makes contact with the two current connecting parts of the low-resistance current measuring resistor by means of in each case at least one through-plating, and
  c) the magnetic field sensor is arranged on the printed circuit board, and
  d) the magnetic field sensor on the one hand and the current measuring resistor on the other hand are arranged on opposite sides of the printed circuit board, and
  e) a compensating resistor is arranged on the printed circuit board, and
  f) the secondary current path runs on and/or in the printed circuit board, while the main current path runs through the low-resistance current measuring resistor, and
  g) an evaluation circuit is arranged on the printed circuit board, which detects at least one of the following:
    g1) the voltage drop across the resistance element of the low-resistance current measuring resistor,
    g2) the output signal of the magnetic field sensor, and
    g3) the voltage drop across the compensating resistor in the secondary current path,
  and
  h) the evaluation circuit has an interface for outputting the output signal of the magnetic field sensor.

2. A current measuring apparatus according to claim 1, wherein the secondary current path has an electrical resistance value which is greater than the resistance of the main current path by a factor of at least 10.

3. A current measuring apparatus according to claim 1, wherein the low-resistance current measuring resistor has a larger current measuring range than the magnetic field sensor.

4. A current measuring apparatus according to claim 1, wherein
a) the compensating resistor is arranged in the secondary current path with the magnetic field sensor,
b) the compensating resistor is dimensioned with respect to its resistance value such that the temperature dependence of the resistance value of the conductor material is at least partially compensated for, c) the main current path and the secondary current path each contain conductor material with a specific first temperature coefficient with respect to the resistance value and resistor material with a specific second temperature coefficient with respect to the resistance value.

5. A current measuring apparatus according to claim 4, wherein the main current path and the secondary current path have the same resistance ratio between the resistance value of the conductor material and the resistance value of the resistor material with a deviation of less than ±20.

6. A current measuring apparatus according to claim 5, wherein
   a) the first temperature coefficient of the conductor material is in the range of 1,000-10,000, and
   b) the second temperature coefficient of the resistor material is in the range of 0 to ±100 ppm/K.

7. A current measuring apparatus according to claim 1, wherein, at least one of the two plate-shaped current connecting parts of the low-resistance current measuring resistor has an incision on at least one side adapted for temperature compensation.

8. A current measuring apparatus according to claim 1, wherein a plurality of voltage measuring contacts are arranged on the plate-shaped current connecting parts of the low-resistance current measuring resistor.

9. A current measuring apparatus according to claim 1, wherein,
   a) the printed circuit board has several layers,
   b) the compensating resistor is arranged on the uppermost layer of the printed circuit board,
   c) the secondary current path upstream of the compensating resistor is divided among a plurality of layers of the printed circuit board,
   d) the secondary current path is brought together upstream of the compensating resistor on the uppermost layer of the printed circuit board and then runs completely through the compensating resistor on the uppermost layer of the printed circuit board, and
   e) the secondary current path downstream of the compensating resistor is again divided into several layers of the printed circuit board.

10. A current measuring apparatus according to claim 4, further comprising voltage measuring contacts for measuring the electrical voltage dropping across the compensating resistor for a current measurement according to the four-wire technique also in the secondary current path, so that the current measurement in the secondary current path is carried out both according to the four-wire technique and by the magnetic field sensor.

11. A current measuring apparatus according to claim 4, wherein
   a) the current measuring apparatus has a high-voltage area and a low-voltage area,
   b) the magnetic field sensor measures the secondary current on the input side in the high-voltage area, and
   c) the magnetic field sensor outputs the output signal on the output side in the low-voltage area,
   d) the compensating resistor is preferably arranged in the high-low-voltage area,
   e) the magnetic field sensor preferably contains an insulation which insulates the low-voltage area from the high-voltage area.

12. A current measuring apparatus according to claim 1, wherein
   a) the current measuring apparatus has a current measuring range that extends to at least 0.5, and
   b) the current measuring apparatus permits an operating voltage of at least 100 V on the input side, and
   c) the conductor material of the current connecting parts of the low-resistance current measuring resistor is copper or a copper alloy or aluminum or an aluminum alloy, and
   d) the resistance material of the resistance element of the low-resistance current measuring resistor is selected from a group consisting of the following alloys:
      d1) a copper alloy,
      d2) a nickel alloy, and
   e) the conductor material of the current connecting parts of the low-resistance current measuring resistor has a lower specific electrical resistance than the resistance material of the resistance element of the low-resistance current measuring resistor, and
   f) the resistive material of the resistor element of the low-resistance current measuring resistor has a specific electrical resistance of less than 1000 μΩcm, and
   g) the conductor material of the current connecting parts of the low-resistance current measuring resistor has a specific electrical resistance of less than 20 μΩcm and
   h) the low-resistance current measuring resistor has a resistance value which is at most 500 mΩ.

13. A current measuring apparatus according to claim 7, wherein
   a) the first temperature coefficient of the conductor material is substantially greater than the second temperature coefficient of the resistor material, in particular by a factor of at least 10,
   b) the compensating resistor in the secondary current path consists of a resistor material which has a substantially lower temperature coefficient than the conductor material.

14. A current measuring apparatus according to claim 10, wherein at least one of the two plate-shaped current connecting parts has an incision in the center adapted for trimming the resistance value.

15. A current measuring apparatus according to claim 13, wherein voltage measuring contacts are distributed transversely to the current flow direction.

16. A current measuring apparatus according to claim 14 or claim 8, wherein the central incision in the plate-shaped current connecting part surrounds one of the voltage measuring contacts as a current shadow.

17. A current measuring apparatus according to claim 1, wherein the main current is greater than the secondary current by a factor of at least 10.

18. A current measuring apparatus according to claim 1, wherein the main current is greater than the secondary current by a factor of at least 100.

19. A current measuring apparatus according to claim 6, wherein the current measuring range of the low-resistance current measuring resistor is larger than the current measuring range of the magnetic field sensor by a factor of at least 10.

20. A current measuring apparatus according to claim 1, wherein the magnetoresistive magnetic field sensor is a GMR sensor.

21. A current measuring apparatus according to claim 1, wherein
   a) the resistance value of the main current path lies in the range of 50 μΩ with a deviation of at most ±50%, and
   b) the resistance value of the secondary current path lies in the range of 20 mΩ with a deviation of maximum ±50%.

* * * * *

UNITED STATES PATENT AND TRADEMARK OFFICE
CERTIFICATE OF CORRECTION

Page 1 of 1

PATENT NO. : 12,480,978 B2
APPLICATION NO. : 18/005345
DATED : November 25, 2025
INVENTOR(S) : Marien et al.

It is certified that error appears in the above-identified patent and that said Letters Patent is hereby corrected as shown below:

In the Claims

In Column 11, Claim 11, Line 60, delete "high-low-voltage" and insert -- low-voltage --, therefor.

Signed and Sealed this
Tenth Day of February, 2026

John A. Squires
*Director of the United States Patent and Trademark Office*